United States Patent [19]
Parrott et al.

[11] Patent Number: 4,860,794
[45] Date of Patent: Aug. 29, 1989

[54] SINGLE ENDED SOLENOID VALVE ASSEMBLY

[75] Inventors: Richard M. Parrott, Noblesville; Jack A. Colvin, Anderson; Lyle W. Shuey, Pendleton, all of Ind.

[73] Assignee: General Motors Corporation, Detroit, Mich.

[21] Appl. No.: 238,949

[22] Filed: Aug. 31, 1988

[51] Int. Cl.[4] .............................................. F15B 13/044

[52] U.S. Cl. ............................. 137/637.2; 137/596.17; 303/119

[58] Field of Search ........................ 137/596.17, 637.2; 303/119

[56] References Cited

U.S. PATENT DOCUMENTS 3,378,031 4/1968 Hatashita ........................ 137/596.17
4,674,536 6/1987 Warrick ..................... 137/596.17 X

*Primary Examiner*—Gerald A. Michalsky
*Attorney, Agent, or Firm*—Ernest E. Helms

[57] ABSTRACT

A dual solenoid valve assembly is provided. The assembly includes a casing joined to a housing having a pressure inlet and outlet, an exhaust port, a first fluid path connecting the inlet and the outlet, and a second fluid path intersecting the first fluid path and connected with the exhaust port. A first valve seat is in the first fluid path and a second valve seat is in the second fluid path. A first solenoid coil is mounted within the casing and a first magnetic solenoid stop is mounted within the first coil. A first solenoid plunger is slidably mounted within the first coil biased away from the first valve seat. A first tubular valve stem is fixably connected with the first plunger for sealably contacting the first valve seat. A second solenoid coil is mounted within the casing on a side of the first coil opposite the housing. A second magnetic stop is mounted within the second coil and a second solenoid plunger is biased away from the stop and is slidably mounted within the second coil. A second valve stem is fixably connected with the second plunger. The second valve stem has a head for sealably contacting the second valve seat.

9 Claims, 2 Drawing Sheets

6 7 27 69 71 79 101 102 18 59 103 15 12 11 10 68 72 91 93 85 73 87 57 110 121 84 81 111 39 132 13 77 86 140 83 130 16 98 21 133 99 97 67 112 66 23 100 15 17 105 19 32 31 11 14 11 26 40 62 65 52 42 41 51 61 37 20 25

7
10
19
21
13
105
11
12
87
15
97
17
103
132
59
57
39
16
98
99
18
102
14
101
100
71
73
23
79
27
25
69
93
20
91
66
37
111
130
81
83
61
51
133
85
41
42
84
140
52
121
65
110
62
77
86
6
40
67
68
26
31
32
72
112

SINGLE ENDED SOLENOID VALVE ASSEMBLY

FIELD OF THE INVENTION

The field of the present invention is that of a control valve for anti-lock vehicle braking system.

DISCLOSURE STATEMENT

Dual solenoid control valves are often utilized in anti-lock braking systems. An example of an anti-lock braking system is described and illustrated in the patent application of Richard M. Parrott et al "Solenoid Valve Assembly" U.S. Ser. No. 138,179, commonly assigned.

SUMMARY OF THE INVENTION

The present invention provides a dual solenoid control valve which is an alternative to that described in the above-noted application. Additionally, the present invention differs from the above application in that the fluid porting is all in one housing which is on a common side of both of the solenoid coils.

It is an object to provide a solenoid valve assembly having a casing joined to a housing, the housing having a pressure inlet, a pressure outlet and an exhaust port, a first fluid path connecting the pressure inlet and the pressure outlet, and a second fluid path intersecting the first fluid path and connected with the exhaust port and a first valve seat in the first fluid path and a second valve seat in the second fluid path the valve assembly including a first solenoid coil mounted within the casing, a first magnetic solenoid stop mounted within the first coil, a first solenoid plunger slidably mounted within the first coil biased away from the first valve seat, a first tubular valve stem fixably connected with the first plunger with a head assembly for sealably contacting the first valve seat upon activation of the first coil whereby fluid communication is allowed in the first fluid valve when the first coil is deactivated, a second solenoid coil mounted within the casing on a side of the first coil opposite the housing, a second magnetic stop mounted within the second coil, a second solenoid plunger biased away from the second stop and slidably mounted within the second coil, a second valve stem fixably connected with the second plunger projecting through into the first magnetic stop, the first plunger and the first valve stem, the second valve stem having a head for sealably contacting the second valve seat upon deactivation of the second coil whereby fluid communication is allowed in the second fluid path when the second coil is activated.

It is another object of the present invention to provide a solenoid valve assembly having a generally cylindrical outer casing joined to a housing, the housing having a pressure inlet, a pressure outlet, an exhaust port, a first fluid path connecting the pressure inlet and the pressure outlet, and a second fluid path intersecting the first fluid path and connected with the exhaust port, and a first valve seat in the first fluid path and a second valve seat in the second fluid path and the housing having a central bore the valve assembly including a cylindrical inner casing sealably mounted within the outer casing, a first solenoid coil mounted between the inner and outer casings, a first magnetic solenoid stop mounted within the inner casing and the first coil mounted within an inner bore of the housing and contacting the same, a first solenoid plunger slidably mounted within the inner casing and the first coil, a first tubular valve stem fixably connected with the first plunger extending through the first magnetic stop with a beaded flange adjacent an end of the first valve stem adjacent an end of the first magnetic stop opposite the first plunger, a valve stem head assembly of an annular head member spring biased against the first stem beaded flange contacted with the first stop for contacting a ball valve member which is in turn for sealably contacting the first valve seat upon activation of the first coil whereby fluid communication is allowed in the first fluid path when the first coil is deactivated, a second solenoid coil mounted between the outer and inner casings on an end of the first solenoid coil opposite the housing, a second magnetic stop positionally fixably mounted within he inner casing and the coil, a second solenoid plunger slidably mounted within the inner casing and second coil and biased away from the second stop, a non-magnetic shim separating the second valve plunger from the second stop, a second valve stem fixably connected with the second plunger extending through the first magnetic stop, the first plunger, and the first valve stem with a head for sealably contacting the second valve seat upon deactivation of the second coil whereby fluid communication is allowed in the second fluid path when the second coil is activated.

It is still another object of the present invention to provide a method of valving a fluid utilizing a solenoid valve assembly having a casing joined to a housing, the housing having a pressure inlet, a pressure outlet and an exhaust port, a first fluid path intersecting the pressure inlet and the pressure outlet, and a second fluid path intersecting the first fluid path and connected with the exhaust port, and a first valve seat in the first fluid path and a second valve seat in the second fluid path, the method including, mounting within the casing a first solenoid coil, mounting within the first solenoid coil in a fixed position with respect to the first solenoid coil a first magnetic stop, slidably mounting within the first solenoid coil a first solenoid plunger within the coil and spring biasing the first solenoid plunger away from the first magnetic stop, fixably connecting a first tubular valve stem with the first plunger having a head assembly for sealably contacting the first valve seat upon activation of the first coil, deactivating the first coil whereby fluid communication is allowed in the first fluid path, mounting within the cylindrical casing a second solenoid coil on a side of the first solenoid coil opposite the housing, fixably mounting within the second solenoid coil a second magnetic stop, slidably mounting within the second solenoid coil a plunger spring biased away from the second magnetic stop, fixably connecting with the second plunger a second valve stem extending through to the first stop, first plunger, and the first valve stem with a head for contacting the second valve seat upon deactivation of the coil, and activating the second coil whereby fluid communication is allowed in second fluid path.

Further objects and advantages of the present invention can become more apparent to those skilled in the art as the nature of the invention is better understood from the accompanying drawings and a detailed description.

DETAILED DESCRIPTION OF THE DRAWINGS

Figure 1:
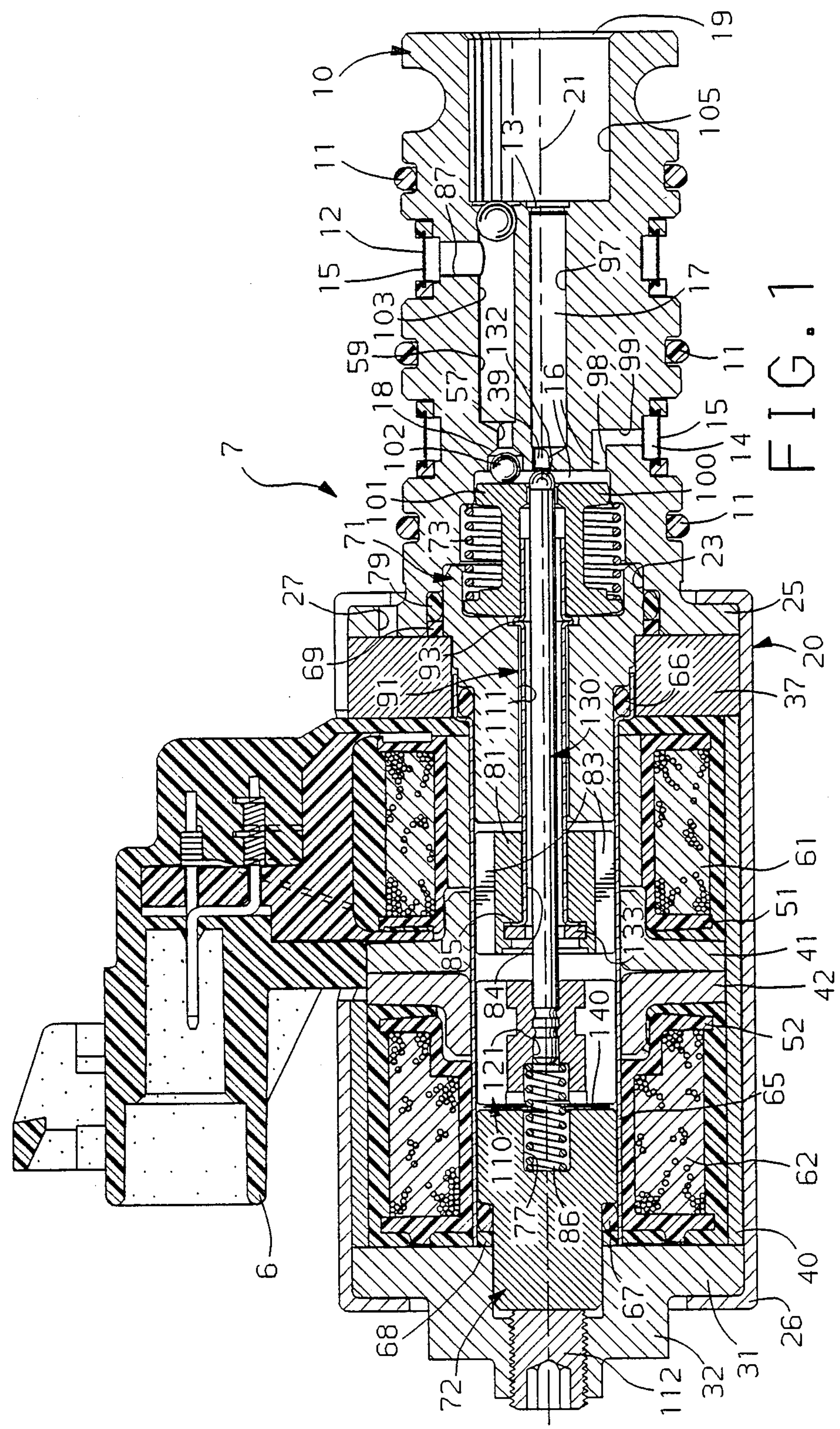
FIG. 1 is a sectional view of a preferred embodiment solenoid valve according to the present invention.
Figure 2:
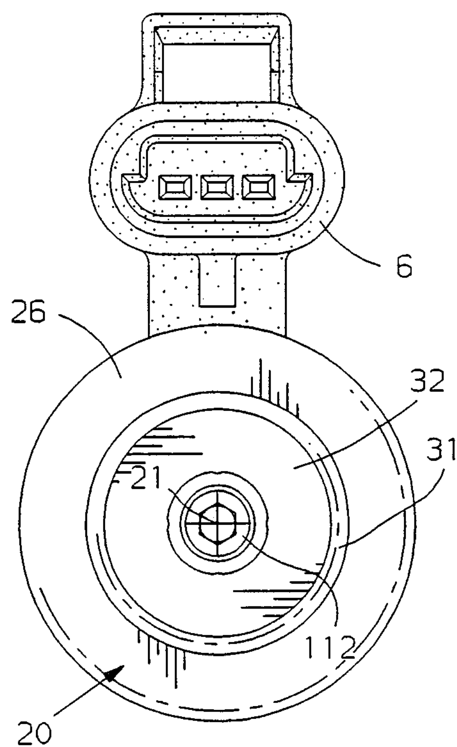
FIGS. 2 and 3 are front and rear elevational views of the valve shown in FIG. 1.
Figure 3:
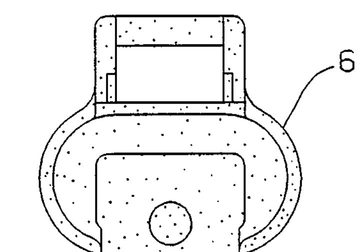

Referring to FIGS. 1, 2 and 3 the solenoid valve assembly 7 has an electrical connector 6, a housing section 10 and an outer cylindrical casing 20. The housing has a pressure inlet port 12 and a pressure outlet port 14. Through a series of drillings and or bores 87, 59, 57, 23, 98, 99 in the housing 10, there is a first fluid path 16 connecting the pressure inlet port 12 with the pressure outlet port 14. Within the first fluid path 16 is first valve seat 18.

The first fluid path is intersected by a series of drillings and bores 103, 97, 105 forming a second fluid path 17 which is also connected with an exhaust port 19. Within the second fluid path 17 is a second valve seat 39. Typically the pump or accumulator (not shown) of an anti-lock braking system (ABS) will be connected with the pressure inlet port 12 (via a prior fluid connection with master cylinder). The brake cylinder or caliper will be connected with the pressure outlet port 14. The exhaust port 19 will typically lead to the brake system reservoir (not shown).

Also provided the housing 10 are screens 15 for catching foreign particles in the braking fluid and an orifice plate 13 which is sized for the braking system that the valve 7 is used for. The pressure outlet port 14, inlet port 12 and exhaust port 19 are axially separated from each other, allowing the housing 10 to have a series of O-rings 11 which allows the ports to be connected along a plurality of positions extending radially from a longitudinal axis 21 of the housing 10.

The housing 10 central bore 23 is multidiametered. The housing also has a projecting flange 25. Flange 25 has an assembly locating bore 27. The housing 10 when assembled in the ABS will fit within a modulator block which has leads to the ABS pump, exhaust, and wheel cylinder or caliper.

Figure 4:
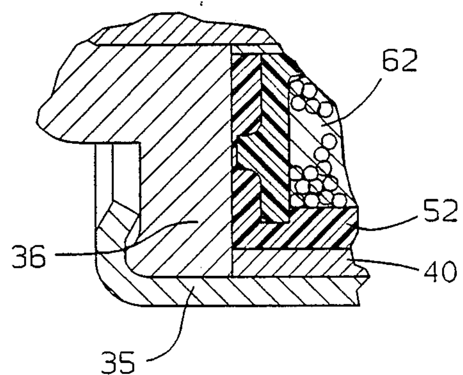
FIG. 4 is a cut away enlarged sectional view of an alternative preferred embodiment.

Joined with the housing 10 is an outer cylindrical casing 20. The outer casing 20 is joined to the housing 10 by the housing flange 25. At a rearward end 26, the outer casing surrounds a flange 31 of the rear washer 32. As shown in FIG. 4 an alternative embodiment of outer casing 35, is crimped around the modified rear washer 36.

A cylindrical frame 40 is mounted within the outer casing between rear washer 32 and a front washer 37. The cylindrical frame 40 has mounted within toward a middle portion two centering washers 41,42 which are opposed to one another. Mounted in a fixed position with respect to the centering washers 41,42 in their own separate coil casings 51 and 52 respectively, are the first 61 and second 62 solenoid coils. The second coil 62 is located on a side of the first coil 61 opposite the housing 10.

Mounted within the solenoid coils 61,62 is an inner casing 65 which is typically fabricated from a non-magnetic tubular stainless steel material. The coils 61,62 are sealed from the interior of inner casing 65 by O-rings 66,67 and a Teflon ring 68. Therefore the interior of inner casing 65 can be exposed to the brake fluid, however, the area between the outer 20 and inner 65 casings and the solenoid coils 61,62 will remain dry and non exposed to the brake fluid.

Fitting within the central bore 23 of the housing 10 and contacting the housing 10 is a first stop 71 fabricated from a magnetic material. The stop 71 is fixed with respect to the first coil 61. The first stop 71 is mounted within the first coil 61 and within the inner casing 65. The first stop 71 also has a central bore 111, 112.

Slidably mounted within the inner casing 65 and the first coil 61 is a first solenoid plunger 81. The first plunger 81 has slots or grooves 83 allowing for the passage of brake fluid to prevent fluid pressure build up upon movement. The first plunger 81 also has a central multidiametered bore 84. The plunger is biased by a spring 73 (in a manner to be described later) away from the first stop 71 and the first valve seat 18.

The first plunger 81 is fixably connected to a first tubular valve stem 91. The first valve stem 91 is captured to the first plunger 81 by a washer 133 which contacts a flaring 85 of the stem 91. Washer 133 is also staked to the first plunger 81.

The first valve stem 91 has along one end a head assembly 100 for sealably contacting the first valve seat 18. The head assembly has an annular member 101 which is biased by the spring 73 and is slidably mounted within the bore 23 of the housing 10. Spring 73 is mounted within the housing central bore 23 and pushes the first annular member 101 against the first stop 71. The first valve stem 91 adjacent one end of the first stop 71 opposite the first plunger 81 has a beaded flange 93 which pushes against the first annular member 101. The first annular member 101 also makes contact with a valve ball 102 which fits within the taper of the first valve seat 18. In the position shown, the first head assembly 100 is normally open (retracted from the first valve seat 18) allowing fluid to flow from the pressure inlet port 12 to the pressure outlet 14 since the brake fluid pressure will lift the ball 102 off the first valve seat 18. To prevent fluid flow in the first fluid 16 passage the first solenoid 61 is activated causing the first valve stop and valve plunger 81 to be magnetized and to be attracted to one another causing the beaded flange 93 of the valve stem 91 to push down on the annular member 101, thereby pushing the ball 102 downward (against the first valve seat 18) and sealing the first fluid path 16. Even when the first fluid path 16 is sealed, (the first coil 61 in an activated state) there will be a slight gap between the first valve plunger 81 and first stop 71 to prevent magnetic lockup. A lock up would cause it to be far more difficult to reverse the first valve stem 91 from the locked position and would increase the time interval required to reopen the first fluid path 16.

More importantly, the gap between the first valve plunger 81 and the first stop 71 exist to ensure that the valve stem 91 can always travel a sufficient amount that the annular member 101 will travel enough to close ball 102 on the first valve seat 18. The gap will compensate for the increased travel (towards housing 10) required when head 100 or first valve seat 18 experiences wear.

Teflon ring 69 and O-ring 79 also aid in sealing the space between the outer 20 and inner casing 65 from the brake fluid. Positionally fixed and mounted within the inner casing 65 and the second solenoid coil 62 is a second magnetic stop 72. The second stop 72 is positionally adjusted within the inner casing 65 by an adjuster screw 112 which is threadably inserted fits within the rear washer 32. Adjuster screw 112 will typically be set and staked to rear washer 32 at the factory for the ABS that the valve 7 will be used for. The second stop 72 has a central bore 77 which mounts a biasing spring 86. Spring 86 pushes against a second cylindrical slotted plunger 110 also fabricated from a magnetic material which is slidably mounted within the inner casing 65 and the second coil 62. The second stop 72 is positionally held by the adjuster screw 112, and the force of the spring 89 and by the friction generated by O-ring 67.

Joined by a staking method to an inner bore 121 of the second plunger 110 is a second valve stem 130 having at its opposite ends a sealing head 132. The second valve stem 130 projects through the first plunger 81, first stop 71 and first stem 91 and is axially aligned with the first stem 91 and axis 21. The head 132 of the second valve stem is normally biased by the spring 86 against the second valve seat 39, thereby preventing fluid flow (in the second fluid path 17) from the ABS pump or from the wheel cylinder or caliper to the fluid reservoir 19.

A non-magnetic shim or washer stop 140, fabricated from a non-magnetic stainless steel is inserted between the second plunger 110 and the second stop 72. The washer stop 140 aids in the prevention of magnetic lockup upon activation of the second coil 62. Activation of the second coil 62 lifts the second valve stem 130 away from the second valve 39 seat, thereby allowing fluid communication in the second fluid path 17 towards the reservoir 13. In the non-activated state of coil 62 the second fluid path 17 is normally closed.

A major advantage of valve 7 is that having all the fluid porting in the housing 10 at one end gives added flexibility. For instance, a return bore can be drilled in housing 10 (usually radially 90o offset from the radial bore 59) providing a third fluid passage (not shown) between the pressure inlet port 12 and outlet port 14. Inserted within the third fluid passage will be a check ball valve allowing fluid flow only towards the pressure inlet port 12.

With the above in non ABS operation fluid can flow from the pressure outlet port 14 (wheel cylinders) back to the pressure inlet port 12 (master cylinder) when the operator takes his foot off the brake.

Another option is for housing 10 is to reverse the functions of the inlet 12 and outlet 14 ports. The above would require a first fluid path from port 14 to an area adjacent to the first valve seat 18 and then out though a drilling and branch connecting with port 12, bore 59 would have to be plugged and the bore 99 to port 14 would have to be plugged.

Still another configuration would reverse the axial locations of the outlet port with the exhaust port. A new bore would connect the housing central bore with the port 19. Former bore 97 would be plugged from port 19 and would instead be branched off to port 14. The former second fluid path portion branching off to port 14 would be eliminated.

The present invention provides a method of valving a fluid utilizing a solenoid valve assembly 7 having a casing 20 joined to a housing 10, the housing having a pressure inlet 12, a pressure outlet 14 and an exhaust port 19, a first fluid path 16 intersecting the pressure inlet and the pressure outlet 14, and a second fluid path 17 intersecting the first fluid path and connected with the exhaust port 19, and a first valve seat 18 in the first fluid path 16 and a second valve seat 39 in the second fluid path 17, the method including the steps of:

1. Mounting within the casing 20 a first solenoid coil 61;

2. Mounting within the first solenoid coil 20 in a fixed position with respect to the first solenoid coil 61 a first magnetic stop 71;

3. Slidably mounting within the first solenoid coil 61 a first solenoid plunger 81 within the coil 61 and spring 73 biasing the first solenoid plunger 81 away from the first magnetic stop 71;

4. Fixably connecting a first tubular valve stem 91 with the first plunger 81 having a head assembly 100 for sealably contacting the first valve seat 18 upon activation of the first coil 61;

5. Deactivating the first coil 61 whereby fluid communication is allowed in the first fluid path 61;

6. Mounting within the cylindrical casing 20 a second solenoid coil 62 on a side of the first solenoid coil opposite the housing 10;

7. Fixably mounting within the second solenoid coil a second magnetic stop 72;

8. Slidably mounting within the second solenoid coil 62 a plunger 110 spring 86 biased away from the second magnetic stop 72;

9. Fixably connecting with the second plunger 110 a second valve stem 130 extending through to the first stop 71, first plunger 81, and the first valve stem 91 with a head 132 for contacting the second valve seat 39 upon deactivation of the second coil 62; and 10. Activating the second coil 62 whereby fluid communication is allowed in second fluid path 17.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A solenoid valve assembly having a casing joined to a housing, said housing having a pressure inlet, a pressure outlet and an exhaust port, a first fluid path connecting said pressure inlet and said pressure outlet, and a second fluid path intersecting said first fluid path and connected with said exhaust port and a first valve seat in said first fluid path and a second valve seat in said second fluid path said valve assembly in combination comprising:

- a first solenoid coil mounted within said casing;
- a first magnetic solenoid stop mounted within said first coil;
- a first solenoid plunger slidably mounted within said first coil biased away from said first valve seat;
- a first tubular valve stem fixably connected with said first plunger with a head assembly for sealably contacting said first valve seat upon activation of said first coil whereby fluid communication is allowed in said first fluid valve when said first coil is deactivated;
- a second solenoid coil mounted within said casing on a side of said first coil opposite said housing;
- a second magnetic stop mounted within said second coil;
- a second solenoid plunger biased away from said stop and slidably mounted within said second coil;
- a second valve stem fixably connected with said second plunger projecting through into said first magnetic stop, said first plunger and said first valve stem, said second valve stem having a head for sealably contacting said second valve seat upon deactivation of said second coil whereby fluid communication is allowed in said second fluid path when said second coil is activated.

2. A valve assembly as described in claim 1 wherein said first and second valve stems, magnetic stops and plungers are sealably mounted within an inner casing sealed from said first and second coils and exposed to said fluid paths.

3. A valve assembly as described in claim 1 wherein there is a non-magnetic shim between one of said magnetic stops and said respective plunger.

4. A valve assembly as described in claim 1 wherein said first head assembly includes an annular member spring biased to a position in contact with said first stop, and said annular member has a central bore for passage of said second valve stem and said first head assembly has a valve ball contacted by said annular member for sealing against said first valve seat.

5. A valve assembly as described in claim 4 wherein said housing has a central bore and said first magnetic stop contacts fits within said housing central bore and said first magnetic stop slidably mounts said annular member.

6. A valve assembly as described in claim 4 wherein said first stem has a beaded flange for contacting said annular head member.

7. A valve assembly as described in claim 1 wherein said second valve stem is axially aligned within said first valve stem.

8. A solenoid valve assembly having a generally cylindrical outer casing joined to a housing, said housing having a pressure inlet, a pressure outlet, an exhaust port, a first fluid path connecting said pressure inlet and said pressure outlet, and a second fluid path intersecting said first fluid path and connected with said exhaust port, and a first valve seat in said first fluid path and a second valve seat in said second fluid path and said housing having a central bore, said valve assembly in combination comprising:

a cylindrical inner casing sealably mounted within said outer casing;

a first solenoid coil mounted between said inner and outer casings;

a first magnetic solenoid stop mounted within said inner casing and said first coil mounted within an inner bore of said housing and contacting the same;

a first solenoid plunger slidably mounted within said inner casing and said first coil;

a first tubular valve stem fixably connected with said first plunger extending through said first magnetic stop with a beaded flange adjacent an end of said first valve stem adjacent an end of said first magnetic stop opposite said first plunger;

a valve stem head assembly of an annular head member spring biased against said first stem beaded flange contacted with said first stop for contacting a ball valve member which is in turn for sealably contacting said first valve seat upon activation of said first coil whereby fluid communication is allowed in said first fluid path when said first coil is deactivated;

a second solenoid coil mounted between said outer and inner casings on an end of said first solenoid coil opposite said housing;

a second magnetic stop positionally fixably mounted within said inner casing and said coil;

a second solenoid plunger slidably mounted within said inner casing and second coil and biased away from said second stop;

a non-magnetic shim separating said second valve plunger from said second stop;

a second valve stem fixably connected with said second plunger extending through the said first magnetic stop, said first plunger, and said first valve stem with a head for sealably contacting said second valve seat upon deactivation of said second coil whereby fluid communication is allowed in said second fluid path when said second coil is activated.

9. A method of valving a fluid utilizing a solenoid valve assembly having a casing joined to a housing, said housing having a pressure inlet, a pressure outlet and an exhaust port, a first fluid path intersecting said pressure inlet and said pressure outlet, and a second fluid path intersecting said first fluid path and connected with said exhaust port, and a first valve seat in said first fluid path and a second valve seat in said second fluid path, said method in combination comprising:

mounting within said casing a first solenoid coil;

mounting within said first solenoid coil in a fixed position with respect to said first solenoid coil a first magnetic stop;

slidably mounting within said first solenoid coil a first solenoid plunger within said coil and spring biasing said first solenoid plunger away from said first magnetic stop;

fixably connecting a first tubular valve stem with said first plunger having a head assembly for sealably contacting said first valve seat upon activation of said first coil;

deactivating said first coil whereby fluid communication is allowed in said first fluid path;

mounting within said cylindrical casing a second solenoid coil on a side of said first solenoid coil opposite said housing;

fixably mounting within said second solenoid coil a second magnetic stop;

slidably mounting within said second solenoid coil a plunger spring biased away from said second magnetic stop;

fixably connecting with said second plunger a second valve stem extending through to said first stop, first plunger, and said first valve stem with a head for contacting said second valve seat upon deactivation of said coil; and activating said second coil whereby fluid communication is allowed in second fluid path.

* * * * *